(12) United States Patent
Liao et al.

(10) Patent No.: US 8,917,470 B2
(45) Date of Patent: Dec. 23, 2014

(54) DATA SEQUENCE DETECTION IN BAND-LIMITED CHANNELS USING COOPERATIVE SEQUENCE EQUALIZATION

(71) Applicant: LSI Corporation, San Jose, CA (US)

(72) Inventors: Yu Liao, Longmont, CO (US); Haitao Xia, San Jose, CA (US)

(73) Assignee: LSI Corporation, San Jose, CA (US)

(*) Notice: Subject to any disclaimer, the term of this patent is extended or adjusted under 35 U.S.C. 154(b) by 0 days.

(21) Appl. No.: 13/798,566

(22) Filed: Mar. 13, 2013

(65) Prior Publication Data

US 2014/0268391 A1  Sep. 18, 2014

(51) Int. Cl.
  *G11B 5/035*  (2006.01)
  *G11B 20/10*  (2006.01)

(52) U.S. Cl.
  CPC ................. *G11B 20/10046* (2013.01)
  USPC .................... 360/65; 360/29; 360/32; 360/39

(58) Field of Classification Search
  None
  See application file for complete search history.

(56) References Cited

U.S. PATENT DOCUMENTS

| | | | | |
|---|---|---|---|---|
| 5,729,517 | A * | 3/1998 | Fujiwara et al. | 369/59.22 |
| 6,460,150 | B1 * | 10/2002 | Cideciyan et al. | 714/709 |
| 6,501,610 | B1 * | 12/2002 | Sugawara et al. | 360/65 |
| 7,173,784 | B2 * | 2/2007 | Cideciyan et al. | 360/46 |
| 7,599,450 | B2 * | 10/2009 | Yang et al. | 375/340 |
| 7,702,991 | B2 * | 4/2010 | Haratsch | 714/796 |
| 7,917,836 | B1 | 3/2011 | Burd | |
| 7,936,655 | B2 * | 5/2011 | Hong et al. | 369/53.35 |
| 8,670,198 | B1 * | 3/2014 | Liao et al. | 360/32 |
| 8,699,167 | B2 * | 4/2014 | Xia et al. | 360/65 |
| 8,867,154 | B1 * | 10/2014 | Lu et al. | 360/32 |
| 2003/0099313 | A1 * | 5/2003 | Li et al. | 375/343 |
| 2005/0169412 | A1 * | 8/2005 | Yang et al. | 375/350 |
| 2005/0219985 | A1 * | 10/2005 | Nakahira | 369/59.13 |
| 2006/0176947 | A1 * | 8/2006 | Lim | 375/232 |
| 2008/0180825 | A1 * | 7/2008 | Erden et al. | 360/39 |
| 2008/0192378 | A1 * | 8/2008 | Bliss et al. | 360/69 |
| 2009/0213923 | A1 * | 8/2009 | Chen et al. | 375/233 |
| 2009/0268575 | A1 | 10/2009 | Tan et al. | |
| 2010/0061492 | A1 * | 3/2010 | Noeldner | 375/343 |
| 2010/0067628 | A1 * | 3/2010 | Buehner et al. | 375/346 |
| 2010/0229031 | A1 | 9/2010 | Tan et al. | |
| 2011/0013306 | A1 * | 1/2011 | Sawaguchi et al. | 360/40 |
| 2011/0242692 | A1 * | 10/2011 | Blinick et al. | 360/31 |
| 2011/0246864 | A1 * | 10/2011 | Eleftheriou et al. | 714/799 |
| 2012/0066561 | A1 * | 3/2012 | Feller | 714/746 |
| 2012/0089657 | A1 * | 4/2012 | Yang et al. | 708/323 |
| 2014/0086298 | A1 * | 3/2014 | Lu et al. | 375/232 |

* cited by examiner

*Primary Examiner* — Dismery Mercedes
(74) *Attorney, Agent, or Firm* — Hamilton DeSanctis & Cha (57) ABSTRACT

A method for detecting a data sequence includes generating a sample stream, which is a time-sequenced digital signal associated with samples of an analog signal. The sample stream is input to n equalization filter banks, which each have m equalization filters to generate m equalized sample streams. The m equalized sample streams from each equalization filter bank are input to a corresponding one of n noise predictive filters. Each noise predictive filter is an m-tap noise predictive filter that receives the m equalized sample streams from a corresponding one of the n equalization filter banks. Each noise predictive filter is associated with one of n data patterns. A filtered equalization stream is generated by each noise predictive filter. Noise sample streams are generated using the filtered equalization streams generated by the n noise predictive filters. A data sequence is detected using the noise sample streams.

24 Claims, 6 Drawing Sheets

DATA SEQUENCE DETECTION IN BAND-LIMITED CHANNELS USING COOPERATIVE SEQUENCE EQUALIZATION

FIELD OF THE INVENTION

The field generally relates to data sequence detection techniques and, in particular, to circuits and methods for implementing cooperative sequence equalization adaptation techniques to enhance data sequence detection in band-limited channels, such as a read channel in a magnetic disk storage system.

BACKGROUND

Storage devices such as hard disk drives are used to provide non-volatile data storage in a wide variety of different types of data processing systems. A typical hard disk drive comprises a spindle that holds one or more flat circular storage disks, also referred to as platters. Each storage disk comprises a substrate made from a non-magnetic material, such as aluminum or glass, which is coated with one or more thin layers of magnetic material. In a magnetic storage system, a digital data sequence is written as a sequence of magnetic flux transitions onto the surface of the magnetic medium in concentric, radially spaced tracks at a predetermined baud rate. The sequence of magnetic flux transitions corresponding to the digital data sequence are written onto the surface of the magnetic medium with a read/write head coil. The digital data sequence serves to modulate current in the read/write head coil. When reading the recorded data from the magnetic medium, the read/write head passes over the surface of the magnetic medium and transduces magnetic flux transitions into pulses of alternating magnetic polarity in a continuous time analog read signal. These pulses are decoded by read channel circuitry to reproduce the digital data sequence. Within increasing data density, magnetic flux transitions are packed closer together on the magnetic medium. As a result, adjacent magnetic pulses begin to overlap with one another, causing distortions, generally known as intersymbol interference ("ISI"), in the read signal. ISI can lead to detection errors.

SUMMARY

In an embodiment of the invention, a method is provided for detecting a data sequence. The method includes generating a sample stream, wherein the sample stream is a time-sequenced digital signal associated with samples of an analog signal. The sample stream is input to n equalization filter banks, wherein each equalization filter bank includes m equalization filters. The sample stream is equalized using each of the m equalization filters in each of the n equalization filter banks to generate m equalized sample streams from each equalization filter bank. The m equalized sample streams generated by the n equalization filter banks are input to a corresponding one of n noise predictive filters. Each noise predictive filter is an m-tap noise predictive filter that receives the m equalized sample streams from a corresponding one of the n equalization filter banks. Each noise predictive filter is associated with one of n data patterns. A filtered equalization stream is generated by each of the n noise predictive filters. Then, n noise sample streams are generated using the filtered equalization streams generated by the n noise predictive filters. A data sequence is detected using the n noise sample streams.

Other embodiments of the invention will become apparent.

WRITTEN DESCRIPTION

Figure 1:
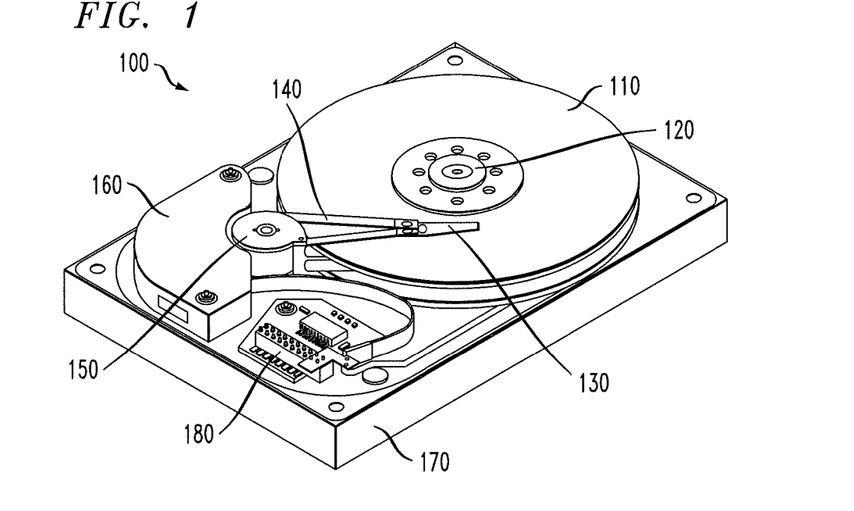
FIG. 1 shows a perspective view of a disk-based storage device according to an embodiment of the invention.

FIG. 1 shows a storage device 100 according to an embodiment of the invention. The storage device 100 comprises a hard disk drive that includes a storage disk 110. The storage disk 110 has a storage surface coated with one or more magnetic materials that are capable of storing data bits in the form of respective groups of media grains oriented in a common magnetization direction (e.g., up or down). The storage disk 110 is connected to a spindle 120. The spindle 120 is driven by a spindle motor (not explicitly shown in FIG. 1) to spin the storage disk 110 at high speed. Data is read from and written to the storage disk 110 via a read/write head 130 that is mounted on a positioning arm 140. An actuator motor 150 (or voice coil motor) is connected to one end of the positioning arm 140 opposite the read/write head 130. The actuator motor 150 comprises a permanent magnet and a moving coil motor, which operate to controllably swing the read/write head 130 into a desired position across the magnetic surface of the storage disk 110 as the storage disk 110 spins by operation of the spindle motor. The storage device 100 further comprises an upper housing 160 which houses driver circuitry and other mechanical and electronic components for controlling the actuator motor 150 and the spindle motor. The upper housing 160 further comprises control circuitry such as preamplifier electronics that are mounted proximate to the pivot location of the actuator motor 150. Thin printed-circuit cables are used to connect the read/write heads 130 to the preamplifier electronics mounted in the housing 160.

The storage device 100 further comprises other control circuitry mounted on or more printed circuit boards that are disposed in a lower housing 170 of the storage device 100. The control circuitry comprises various drive electronics, signal processing electronics, and associated processing and memory circuitry, to control the writing and reading of data to and from the storage disk, as well as additional or alternative elements that are utilized to drive and control the spindle and actuator motors. A connector 180 is used to connect the storage device 100 to a host computer or other related processing device.

FIG. 1 shows an embodiment of the invention with one instance of each of the single storage disk 110, read/write head 130, and positioning arm 140. In an alternate embodiment of the invention, the storage device 100 comprises multiple instances of one or more of these or other drive components. For example, in an alternative embodiment of the invention, the storage device 100 comprises multiple storage disks attached to the same spindle such that each storage disk rotates at the same speed, as well as multiple read/write heads and associated positioning arms coupled to one or more actuators.

A read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. Such heads may comprise, for example, write heads with wrap-around or side-shielded main poles, or any other types of heads suitable for recording and/or reading data on a storage disk.

In addition, the storage device 100 as illustrated in FIG. 1 may include other elements in addition to, or in place of, those specifically shown, including one or more elements of a type commonly found in conventional storage devices. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
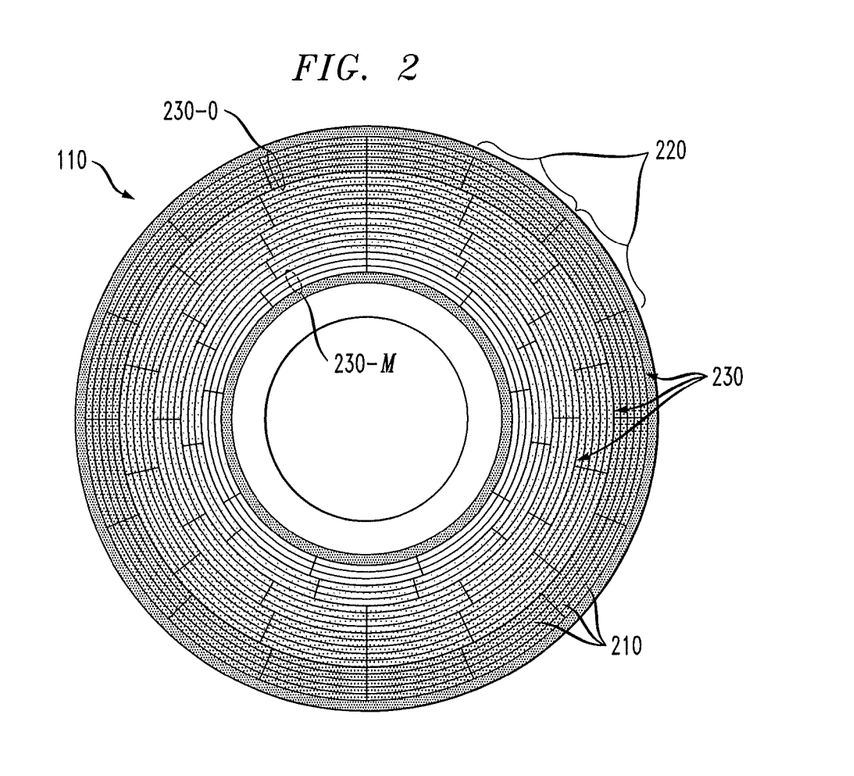
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 that are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head 130 is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Accordingly, the outermost annular zone 230-0 of the storage disk has a higher average data transfer rate than the innermost annular zone 230-M of the storage disk. The average data transfer rates may differ between the innermost and outermost annular zones in a given embodiment of the invention by more than a factor of two. For example, in one embodiment of the invention, the outermost annular zone may have a data transfer rate of approximately 2.3 Gigabits per second (Gb/s), while the innermost annular zone has a data transfer rate of approximately 1.0 Gb/s. In such an implementation, the hard disk drive may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The storage disk 110 may be assumed to include a timing pattern formed on its storage surface. Such a timing pattern may comprise one or more sets of servo address marks (SAMs) or other types of servo marks formed in particular sectors in a conventional manner SAMs may therefore be viewed as an example of what are more specifically referred to herein as servo marks. The particular data transfer rates and other features described above are presented for purposes of illustration only, and should not be construed as limiting in any way. A wide variety of other data transfer rates and storage disk configurations may be used in other embodiments.

Figure 3:
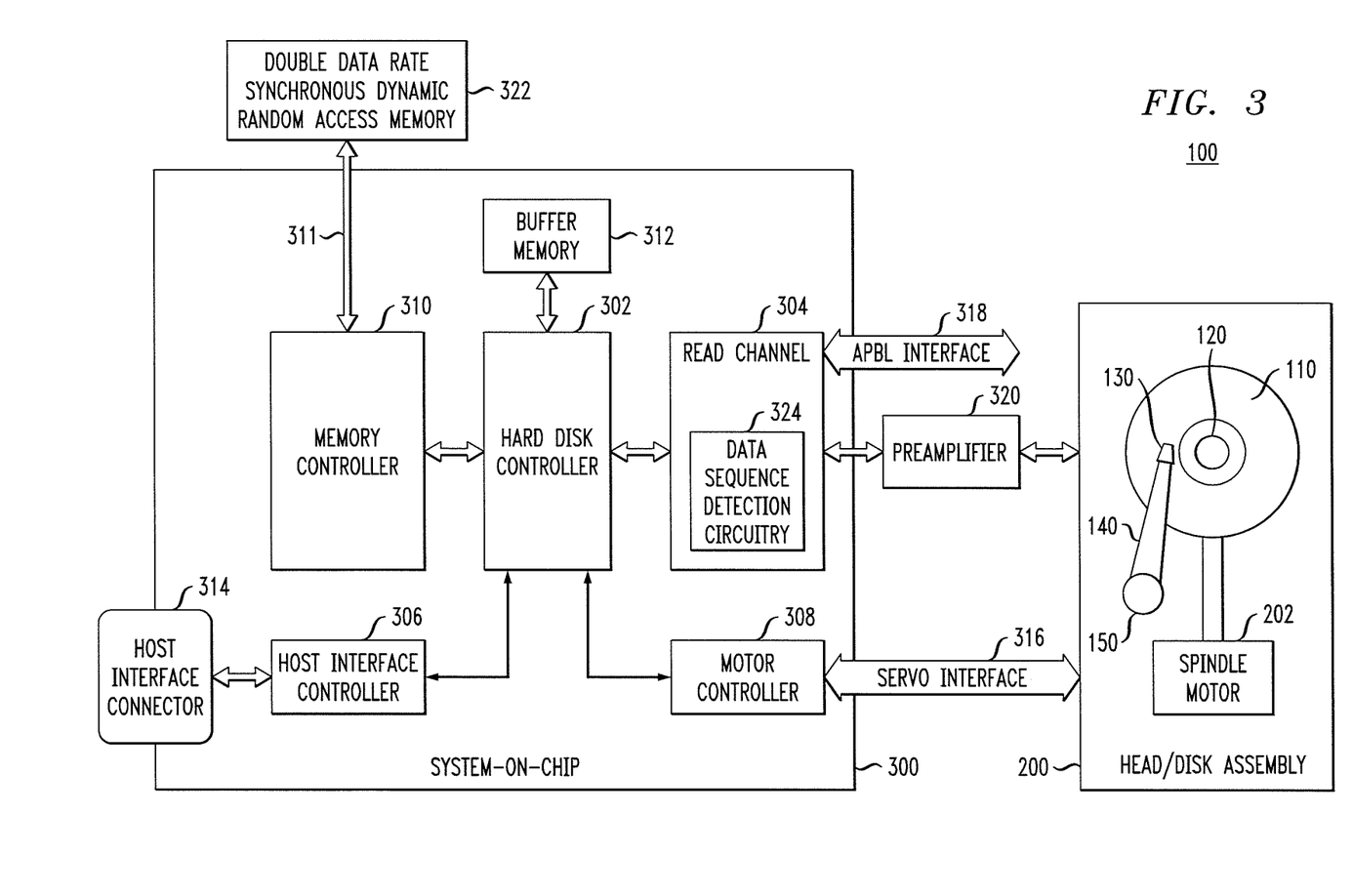
FIG. 3 schematically illustrates a storage device according to another embodiment of the invention.

FIG. 3 schematically illustrates a storage device according to another embodiment of the invention. In particular, FIG. 3 illustrates an embodiment of the storage device 100 of FIG. 1 in greater detail. As shown in FIG. 3, the storage device 100 comprises a read/write head and disk assembly 200 and a system-on-chip 300. The read/write head and disk assembly 200 comprises components such as a storage disk 110, spindle 120, read/write head 130, positioning arm 140, actuator motor 150, and a spindle motor 202, as discussed above with reference to the embodiment of FIG. 1. The system-on-chip 300 comprises various integrated circuits such as a hard disk controller 302, a read channel integrated circuit 304, a host interface controller 306, a motor controller 308, a memory controller 310, and a buffer memory 312. The system-on-chip 300 further comprises a plurality of interfaces such as a host interface connector 314, a servo interface 316, and a bidirectional APBL (Advanced Peripheral Bus-Light) interface 318. The storage device 100 further comprises a preamplifier 320 and an external random access memory 322.

The host interface connector 314 represents a physical connector (e.g., connector 180 as shown in FIG. 1) and associated input/output (I/O) bus wiring that connects the storage device 100 to a host system, device, I/O bus, or other components of a data processing system. The I/O data is moved to and from the storage device 100 through the host interface connector 314 under control of the host interface controller 306. The host interface controller 306 implements communication protocols for communicating with a host system or device and controlling and managing data I/O operations, using one or more known interface standards. For example, in one or more alternative embodiments of the invention, the host interface connector 314 and host interface controller 306 are implemented using one or more of Small Computer interface (SCSI), Serial Attached SCSI (SAS), Serial Advanced Technology Attachment (SATA) and/or Fibre Channel (FC) interface standards, for example.

The hard disk controller 302 controls the overall operations of writing and reading data to and from the storage disk 110. In one embodiment of the invention, the hard disk controller 302 is an ARM (Advanced Reduced instruction set computing Machine). In other embodiments, the hard disk controller 302 may comprise other known architectures suitable for controlling hard disk operations. The read channel integrated circuit 304 encodes and decodes data that is written to and read from the storage disk 110 using the read/write head 130. The read channel integrated circuit 304 comprises data sequence detection circuitry 324 for reproducing and detecting a digital data sequence read from the storage disk 110. The data sequence detection circuitry 324 implements circuits and methods as discussed below with reference to FIGS. 4, 5 and 6 according to embodiments of the invention. The read channel integrated circuit 304 further implements other types of circuitry that is commonly implemented to process data that is read from and written to the storage disk 110. The preamplifier 320 is connected between the read channel integrated circuit 304 and the read/write head 130. The preamplifier 320 amplifies an analog signal output from the read/write head 130 for input to the read channel integrated circuit 304 and provides a voltage bias for a magnetic sensor of the read/write head 130. The APBL interface 318 is used to access internal registers of the read channel integrated circuit 304. Depending on the storage system architecture, a controller (e.g., on-chip controller, off-chip controller, or remote controller that is external to the storage device 100) can be connected to the read channel integrated circuit 304 via the APBL interface 318, as necessary, to access internal registers and program the read channel integrated circuit 304.

The motor controller 308 is connected to the head/disk assembly 200 via the servo interface 316. The motor controller 308 sends control signals to the spindle motor 202 and actuator motor 150 through the servo interface 318 during read and write operations to spin the storage disk 110 and move the read/write head 130 into a target position. In particular, for a typical read operation, signals for performing a read operation are received through the host interface connector 316 and sent to the hard disk controller 302 through the host interface controller 306. The hard disk controller 302 processes the read signals for performing the read operation and then sends control signals to the motor controller 308 for controlling the actuator motor 150 and spindle motor 202 for the read operation. Additionally, the hard disk controller 302 sends the processed read signals to the read channel integrated circuit 304, which are then sent to the actuator motor 150 through the preamplifier 326 to perform the read operation. The actuator motor 150 positions the read/write head 130 over a target data track on storage disk 110 in response to control signals received by the motor controller 308 and the read channel integrated circuit 304. The motor controller 308 also generates control signals to drive the spindle motor 202 to spin the storage disk 110 under the direction of the hard disk controller 302. The spindle motor 202 spins the storage disk 110 at a determined spin rate.

When the read/write head 130 is positioned adjacent the target data track, magnetic signals representing data on the storage disk 110 are sensed by read/write head 130 as the storage disk 110 is rotated by the spindle motor 202. The sensed magnetic signals are provided as continuous, minute analog signals representative of the magnetic data on the storage disk 110. The analog signals are transferred from the read/write head 130 to the read channel integrated circuit 304 via the preamplifier 320. The preamplifier 320 amplifies the analog signals accessed from storage disk 110, and the read channel integrated circuit 304 decodes and digitizes the received analog signals to recreate the information originally written to the storage disk 110. The data read from the storage disk 110 is then output to a host system or device through the host interface controller 306 and host interface connector 314 under control of the hard disk controller 302.

A write operation is substantially the opposite of a read operation. For example, in one embodiment, write signals for performing write operations are received through the host interface connector 314, wherein the write signals represent commands to perform a write operation and/or data that is to be written to the storage disk 110. The write signals are sent to the hard disk controller 302 through host interface controller 306. The hard disk controller 302 processes the write signals for performing the write operation and then sends control signals to the motor controller 308 for controlling the actuator motor 150 and spindle motor 202 for the write operation. Additionally, the hard disk controller 302 sends the processed write signals (and formatted data) to the read channel integrated circuit 304, wherein the formatted data to be written is encoded. The write signals (control and data) are then sent to the actuator motor 150 through the preamplifier 320 to perform a write operation by writing data to the storage disk 110 via the read/write head 130.

In the embodiment of FIG. 3, the external random access memory 322 is an external memory relative to the system-on-chip 300 and other components of the storage device 100, but is nonetheless internal to the storage device 100. In one embodiment, the external random access memory 322 is a double data rate synchronous dynamic random access memory, although a wide variety of other types of memory may be used in alternate embodiments. The external random access memory 322 is initialized by the memory controller 310. The memory controller 310 performs signaling control of the external random access memory 322 on behalf of the hard disk controller 302, whereby initialization of the external random access memory 322 is implemented via the programming of configuration registers in the memory controller 310 by the disk controller 302. In operation, the memory controller 310 generates internal clock pulses for synchronizing data write operations and read operations of the external random access memory 322. The internal clock signals and data are transmitted to and from the external random access memory 322 via a data/signal bus 311.

In one embodiment of the invention, the external random access memory 322 serves as a buffer memory for data transfers between a host system/device and the storage device 100. For example, the read and or write signals (as discussed above) that are received by the hard disk controller 302 from the host interface controller 306 can be temporarily stored in the external random access memory 322 before being processed by the hard disk controller 302 and the read channel integrated circuit 304, for example. Moreover, data that is read out from the storage disk 110 may be temporarily stored in the external random access memory 322 before being packaged and output to a host system/device by operation of the hard disk controller 302 and the host interface controller 306. This buffering optimizes the throughput of the storage device 100 by matching disparate processing and data transmission speeds as data passes to and from the storage disk 110. The buffer memory 312 comprises on-chip memory that is used by the hard disk controller to temporarily store data and/or instructions for performing read/write operations. In one embodiment of the invention, the internal buffer memory 314 is used by the system-on-chip 300 as a buffer memory for normal functional mode operations. In one embodiment of the invention, the internal memory buffer 312 is used as a LLI (Long Latency Interface) buffer memory for normal functional mode operations of the system-on-chip 300.

It is to be understood that the external random access memory 322, system-on-chip 300 and preamplifier 320 shown in FIG. 3 collectively represent one embodiment of "control circuitry" as that term is utilized herein. Numerous alternative embodiments of "control circuitry" include a subset of the components 300, 320 and 322 or portions of one or more of these components. For example, the system-on-chip 300 itself may be viewed as an example of "control circuitry" to process data received from and supplied to the read/write head 130 and to control positioning of the read/write head 130 relative to the storage disk 110. Certain operations of the system-on-chip 300 in the storage device 100 of FIG. 3 may be directed by the disk controller 302, which executes code stored in the external random access memory 322 and/or the internal buffer memory 312, for example. Thus, at least a portion of the control functionality of the storage device 100 may be implemented at least in part in the form of software code.

Furthermore, although the embodiment of FIG. 3 illustrates various components of the system-on-chip 300 being implemented on a single integrated circuit chip, the system-on-chip 300 may include other integrated circuits, such as the external random access memory 322 or the preamplifier 320, or portions thereof. Moreover, the disk controller 302, host interface controller 306, and motor controller 308, may be implemented using suitable integrated circuit architectures such as microprocessor, digital signal processor (DSP), application-specific integrated circuit (ASIC), or field-programmable gate array (FPGA), or other types of integrated circuit architectures.

As noted above, the read channel integrated circuit 304 comprises data sequence detection circuitry 324 for reproducing and detecting a digital data sequence read from the storage disk 110. In a band limited channel, such as a read channel in a magnetic storage system, one embodiment of the data sequence detection circuitry 324 employs a cooperative equalization scheme to significantly reduce noise variance at an output of a noise predictive filter without compromising a minimum distance of a Viterbi-based detection process that is based on noise predictive finite impulse response filtering. A cooperative equalization scheme as described herein provides an efficient process to reduce the noise variance at an output of noise predictive finite impulse response filters without compromising the minimum distance of a Viterbi detector that is primarily determined by equivalent targets, which is equal to the convolution of the noise predictive filter coefficients and an equalization target. For example, the data sequence detection circuitry 324 implements circuits and methods as discussed below with reference to FIGS. 4, 5 and 6 according to embodiments of the invention.

Figure 4:
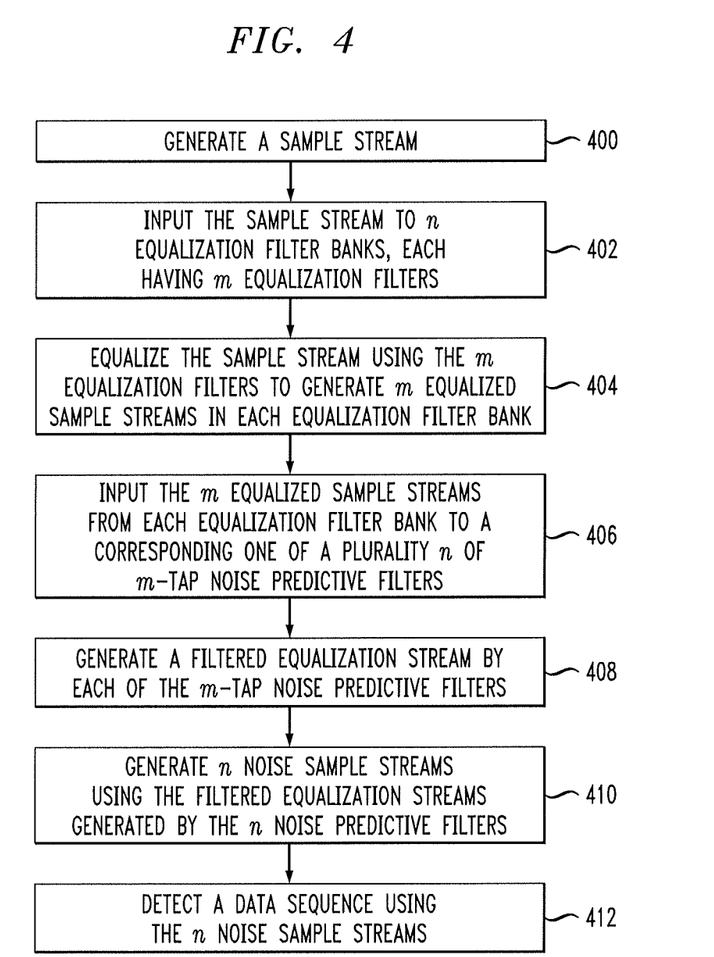
FIG. 4 illustrates a method for data sequence detection according to an embodiment of the invention.

FIG. 4 illustrates a method for data sequence detection according to an embodiment of the invention. An initial step includes generating a first sample stream (block 400). The first sample stream is a time-sequenced digital signal associated with samples of an analog signal. In the context of a read channel for a storage system as shown in FIG. 3, the analog signal is an analog read channel signal containing data read from a storage disk. A next step includes inputting the sample stream to n equalization filter banks, wherein each equalization filter bank comprises m equalization filters (block 402). The sample stream is then equalized using the m equalization filters in each of the n equalization filter banks to generate m equalized sample streams in each of the n equalization filter banks (block 404). The m equalized sample streams from each of the n equalization filter banks are input to a corresponding one of a plurality n of m-tap noise predictive filters (block 406). Each noise predictive filter is an m-tap noise predictive filter that receives the m equalized sample streams from a corresponding one of the n equalization filter banks, and each noise predictive filter is associated with one of n data patterns. A filtered equalization stream is generated by each of the n noise predictive filters (block 408). Then, n noise sample streams are generated using the filtered equalization streams generated by the n noise predictive filters (block 410). A data sequence is detected using the n noise sample streams (block 412).

Figure 5:
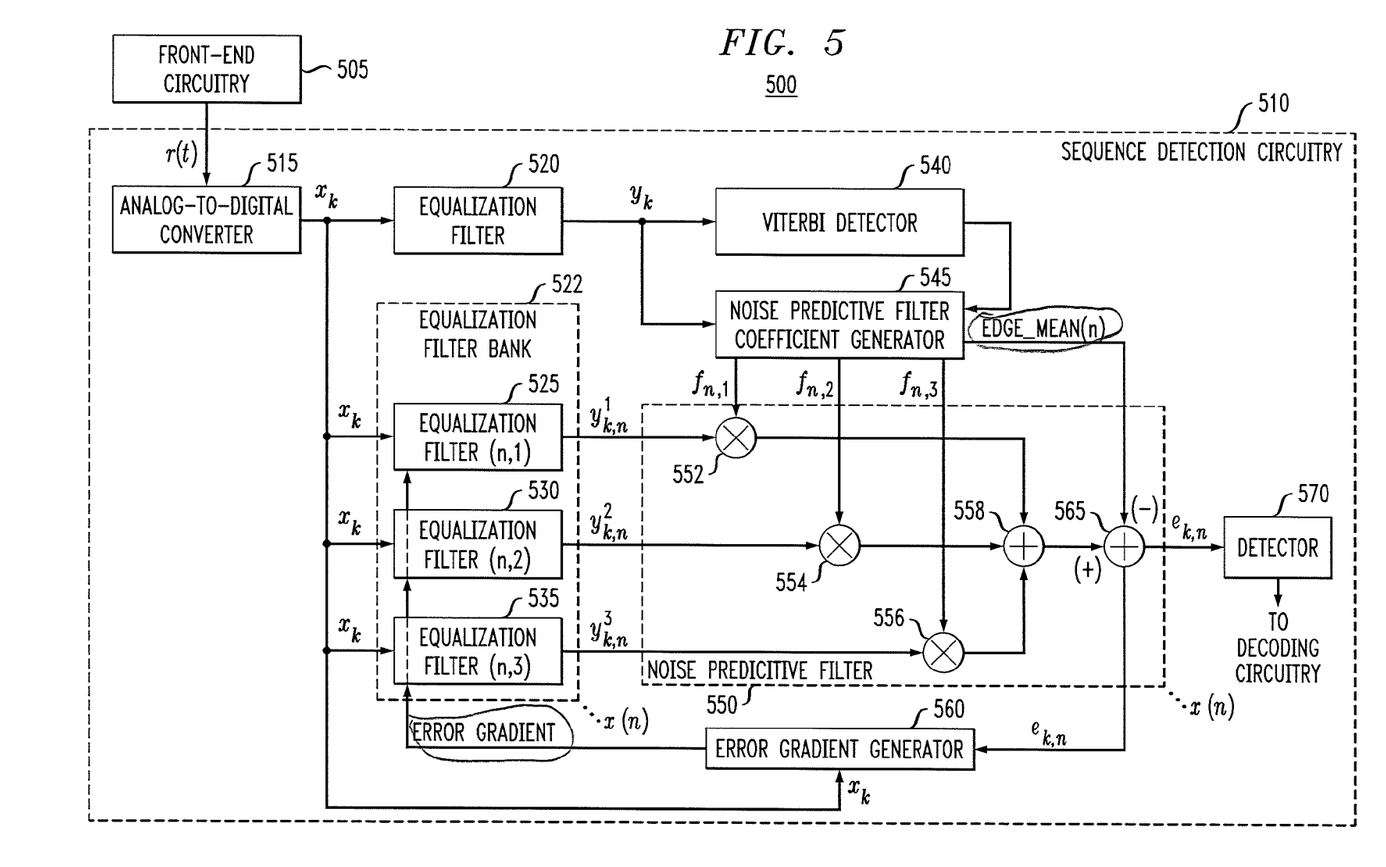
FIG. 5 is a block diagram of a circuit for reading data from a storage medium, which comprises a data sequence detection circuit according to an embodiment of the invention.

FIG. 5 is a block diagram of a circuit for reading data from a storage medium, which comprises a data sequence detection circuit according to an embodiment of the invention. FIG. 5 illustrates an embodiment of a circuit for implementing the method discussed above with reference to FIG. 4. In particular, FIG. 5 is a block diagram of a read channel 500 for reading data from a storage disk comprising front-end circuitry 505 and sequence detection circuitry 510. In general, the front-end circuitry 505 includes circuit components such as read head circuitry (which is part of a read/write head 130), a preamplifier (e.g., preamplifier 320, FIG. 3), a VGA (variable gain amplifier) and a continuous time filter. For a read operation, the read head and preamplifier convert data and other information stored on a storage disk into an analog read signal using known techniques. The VGA adjusts the amplitude of the analog read signal to a value that is suitable for a dynamic range of a downstream analog-to-digital converter (ADC). The continuous time filter, is a pulse-shaping filter, which serves to filter the gain-adjusted analog read signal for anti-aliasing purpose and providing proper high frequency boost, and output a filtered analog read signal, r(t). In one embodiment, the continuous time filter is a low-pass filter that filters the analog read signal before it is sampled to reduce the effects of aliasing. The VGA and continuous time filter process the analog waveform to a desired pulse amplitude and bandwidth for conversion to a digital signal.

In general, the sequence detection circuitry 510 comprises various integrated circuits including an analog-to-digital converter 515, an equalization filter 520, an equalization filter bank 522, a Viterbi detector 540, a noise predictive filter coefficient generator 545, a noise predictive filter 550, an error gradient generator 560, and a detector 570. In one embodiment of the invention, the equalization filter bank 522 comprises a plurality (m) of equalization filters 525, 530, and 535, wherein m=3. In one embodiment of the invention, each of the m equalization filters 525, 530, and 535 in each equalization filter bank 522 is a digital finite impulse response filter. The noise predictive filter 550 comprises plurality of multipliers 552, 554, and 556, a first adder 558, and a second adder 565. For ease of illustration, FIG. 5 depicts one equalization filter bank 522 and one noise predictive filter 550, although there are a total of n parallel equalization filter banks and a total of n parallel noise predictive filters, wherein outputs of the $n^{th}$ equalization filter bank are connected to inputs of the corresponding $n^{th}$ noise predictive filter.

The analog-to-digital converter 515 (ADC) receives the analog read signal r(t) from the front-end circuitry 505, and samples the analog read signal r(t) in response to a sample clock to convert the analog read signal r(t) into a digital signal. In particular, the analog-to-digital converter 515 samples the analog read signal r(t) and generates an ADC sample stream $x_k$, which is a time-sequenced digital signal associated with samples of the analog read signal r(t). The ADC sample stream $x_k$ may comprise a number of samples. In one embodiment of the invention, the analog-to-digital converter 515 has a programmable sampling phase that can be selected based on an equalization target of equalization filters used in the sequence detection circuitry 510. The ADC sample stream $x_k$ is input to the equalization filter 520 and each equalization filter bank 522, wherein the ADC sample stream $x_k$ is input to each of the m equalization filters 525, 530, and 535 in each equalization filter bank 522. In addition, the ADC sample stream $x_k$ is input to the error gradient generator 560.

The equalization filter 520 filters the ADC sample stream $x_k$ to generate an equalized sample stream $y_k$. The equalization filter 520 equalizes the ADC sample stream $x_k$ to a specified partial response target (e.g., PR4, EPR4, $E^2$PR4, etc.) that represents or approximates a frequency response of the read back signal of the data that is stored on the storage disk. In one embodiment, the equalization filter 520 is a digital finite impulse response filter that is configured such that the spectrum of the equalization filter output $y_k$ has a shape that is similar to that of the frequency response of the partial response target. In other embodiments of the invention, other known types of equalization circuits and methods can be implemented instead of or in combination with digital finite impulse response filters to equalize the sample stream.

The equalized sample stream $y_k$ generated by the equalization filter 520 is input to the Viterbi detector 540 and the noise predictive filter coefficient generator 545. In one embodiment, the Viterbi detector 540 is a trellis detector which implements well-known techniques to determine a most likely path corresponding to a data sequence in the equalized sample stream $y_k$. The detection results output from the Viterbi detector 540 represents a most likely data sequence in the equalized sample stream $y_k$. The noise predictive filter coefficient generator 545 processes the equalized sample stream $y_k$ and the detection results output from the Viterbi detector 540 and output a set of noise predictive filters (i.e., filter coefficients, $f_{n,1}$, $f_{n,2}$ and $f_{n,3}$) for each noise predictive filter 550 corresponding to an associated v-bit data pattern.

In particular, in one embodiment of the invention as shown in FIG. 5, each noise predictive filter 550 is a m-tap filter (where m=3). Moreover, the filter coefficients, $f_{n,1}$, $f_{n,2}$ and $f_{n,3}$ are noise predictive finite impulse response (NPFIR) filter coefficients that correspond to a first tap, a second tap, and a third tap, respectively, of the $n^{th}$ noise predictive filter 550, wherein n represents an index of a v-bit data pattern, and wherein the integers 1, 2 and 3 represent a tap index for the first, second and third taps, respectively, of the $n^{th}$ noise predictive filter 550. Each data pattern index n corresponds to a different one of the v-bit data patterns, wherein there are a total of $n=2^v$ different data patterns. For example, for data patterns with 4 bits each (i.e., v=4), there are $n=2^4=16$ possible data patterns. Each index (e.g., n=1, 2, 3, ..., 16) corresponds to a given one of the possible 16 different data patterns. For example, a bit sequence of [0,0,0,0] can be assigned to an index n=1, a bit sequence of [0,0,0,1] can be assigned an index n=2, etc. Moreover, each equalization filter bank 522 and noise predictive filter 550 corresponds to one of the n data patterns. By way of example, in the example embodiment where n=16, there are 16 equalization filter banks and 16 noise predictive filters.

In one embodiment of the invention, the noise predictive filter coefficient generator 545 utilizes the equalized sample stream $y_k$ and the detected data patterns from block 540 during an NPFIR calibration phase to dynamically adapt the noise predictive filter coefficients, $f_{n,1}$, $f_{n,2}$ and $f_{n,3}$ for each v-bit data pattern associated with each noise predictive filter 550 that needs to be calibrated. During an NPFIR calibration phase, the noise predictive filter coefficients $f_{n,1}$, $f_{n,2}$ and $f_{n,3}$ for each data pattern are dynamically generated and stored in a look-up table, for example, and indexed to a given data pattern index value n. An embodiment of a noise predictive filter coefficient adaptation process will be discussed in further detail below with reference to FIG. 6. During the NPFIR calibration phase, the noise predictive filter coefficients $f_{n,1}$, $f_{n,2}$ and $f_{n,3}$ for each of the n data patterns are updated as long as the detected v-bit data patterns from the Viterbi detector 540 match the v-bit data pattern associated with the NPFIR. Furthermore, the noise predictive filter coefficient generator 545 dynamically generates an edge_mean(n) value for each indexed data n, which is also stored in the look-up table and indexed to a corresponding data pattern index n.

Figure 6:
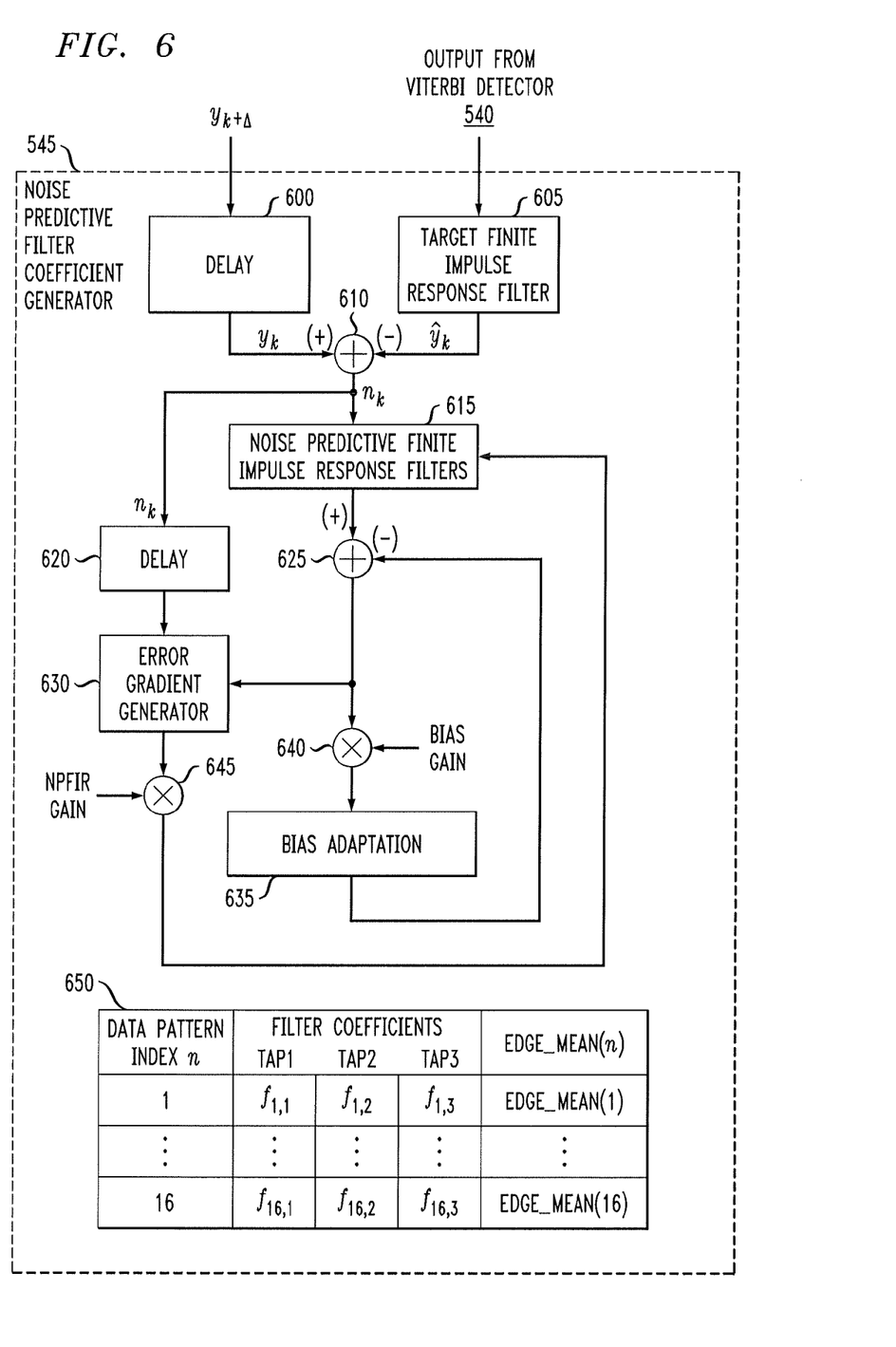
FIG. 6 is a block diagram of a filter coefficient generator circuit shown in FIG. 5, according to an embodiment of the invention.

FIG. 6 illustrates an embodiment of a look-up table 650 that stores noise predictive filter coefficients $f_{n,1}$, $f_{n,2}$ and $f_{n,3}$ and edge_mean(n) values for each of the n data patterns. During the NPFIR calibration stage, the noise predictive filter coefficients $f_{n,1}$, $f_{n,2}$ and $f_{n,3}$ and edge_mean(n) values are not applied to the corresponding $n^{th}$ noise predictive filter 550, but such values are continually adapted by the noise predictive filter coefficient generator 545 until the noise predictive filter coefficients, $f_{n,1}$, $f_{n,2}$ and $f_{n,3}$ and the edge_mean(n) values for each data pattern converge to a sufficient steady state. Once convergence is obtained, the final steady state values of the noise predictive filter coefficients, $f_{n,1}$, $f_{n,2}$ and $f_{n,3}$ and the edge_mean(n) value for each data pattern are stored in the look-up table, and remain constant.

After the NPFIR calibration phase is complete, the adapted noise predictive filter coefficients, $f_{n,1}$, $f_{n,2}$ and $f_{n,3}$ and the edge_mean(n) values that are stored in the look up table for each of the n data patterns are used by each corresponding noise predictive filter 550 to generates error data $e_{k,n}$ that is processed by the detector 570 to detect a data pattern. Moreover, after the NPFIR calibration phase is complete, the error gradient generator 560 generates error gradient data that is used to adapt the m equalization filters 525, 530 and 535 in each equalization filter bank 522. In one embodiment, the error gradient generator 560 receives as input the ADC samples output from the analog-to-digital converter 515 and error data $e_{k,n}$ from the $n^{th}$ noise predictive filter 550 to generate error gradient data that is used to adapt the equalization filters 525, 530 and 535 in the $n^{th}$ equalization filter bank 522. While each equalization filter bank 522 uses the same adaptation algorithm to adapt its corresponding m equalization filters 525, 530 and 535, the error gradient data will be different for each equalization filter bank 522 as the error gradient data is generated for a different one of the n data patterns and applied to the equalization filter bank 522 that corresponds to the $n^{th}$ data pattern.

In one embodiment, the filtering and adaptation processes are implemented as follows. The Viterbi detector 540 outputs an estimated binary sequence $\hat{a}_{k-\Delta}$, $\hat{a}_{k-\Delta-1}$), ..., $\hat{a}_{k-\Delta-v+1}$, ... by processing the equalized sample stream $y_k$ output from the equalization filter 520. The variable $\Delta$ is a positive integer to account for a delay of the Viterbi detector 540. When a given data pattern $\hat{a}_{k-\Delta}$, $\hat{a}_{k-\Delta-1}$, ..., $\hat{a}_{k-\Delta-v+1}$ is detected by the Viterbi detector 540, the noise predictive filter coefficient generator 545 will select and output the noise predictive filter coefficients, $f_{n,1}$, $f_{n,2}$ and $f_{n,3}$ and the edge_mean(n) values that correspond to the index, n, of the detected v-bit data pattern $\hat{a}_{k-\Delta}$, $\hat{a}_{k-\Delta-1}$, ..., $\hat{a}_{k-\Delta-v+1}$. The noise predictive filter coefficients, $f_{n,1}$, $f_{n,2}$ and $f_{n,3}$ and the edge_mean(n) values are processed by the corresponding $n^{th}$ noise predictive filter 550 to generate the filtered noise sample $e_{k,n}$ as follows:

$$e_{k,n} = \sum_{j=1}^{3} f_{n,j} \cdot y_{k,n}^{j} - \text{edge\_mean}(n) \qquad \text{Eqn. (1.0)}$$

wherein n is the index of the v-bit data pattern $\hat{a}_{k-\Delta}$, $\hat{a}_{k-\Delta-1}$, ..., $\hat{a}_{k-\Delta-v+1}$, wherein edge_mean(n) is a mean value of a desired signal for the given data pattern, wherein j=1,2,3, $f_{n,j}$ are the corresponding noise predictive filter coefficients for the $n^{th}$ noise predictive filter 550, and wherein $y_{k,n}^{j}$, are the outputs of the equalization filters 525, 530 and 535 of the $n^{th}$ equalization filter bank 522. The outputs of the equalization filters 525, 530 and 535 of the $n^{th}$ equalization filter bank 522 are given by the following equation:

$$y_{k,n}^{j} = \sum_{l=0}^{L-1} f_{l}^{(n,j)} \cdot x_{k-l} \qquad \text{Eqn. (1.1)},$$

wherein L is the number of taps in each equalization filter of the $n^{th}$ equalization filter bank, wherein $f_{l}^{(n,j)}$, l=0, 1, ..., L−1, are the coefficients of the $j^{th}$ filter in the $n^{th}$ equalization filter bank 522 corresponding to the $n^{th}$ data pattern, and wherein $x_k$ is the ADC sample at the output of the analog-to-digital converter 515.

FIG. 5 illustrates the computations of Equations (1.0) and (1.1). The equalization filters 525, 530, and 535 of the equalization filter bank 522 concurrently receive the ADC sample stream $x_k$ as input and generate different equalized sample streams $y_{k,n}^1$, $y_{k,n}^2$, and $y_{k,n}^3$, respectively. The first equalized sample stream $y_{k,n}^1$ is input to the first multiplier 552 and multiplied by the noise predictive filter coefficients $f_{n,1}$ (first tap). The second equalized sample stream $y_{k,n}^2$ is input to the second multiplier 554 and multiplied by the noise predictive filter coefficients $f_{n,2}$ (the second tap). Moreover, the third equalized sample stream $y_{k,n}^3$ is input to the third multiplier 565 and multiplied by the noise predictive filter coefficients $f_{n,3}$ (the third tap). The output of the first, second and third multipliers 552, 554, and 556 are input to the adder 558 and summed together (i.e., $\Sigma_{j=1}^3 f_{n,j} \cdot y_{k,n}^j$) to generate a filtered equalization stream at the output of the first adder 558. The output of the first adder 558 is input the second adder 565, which subtracts an edge_mean(n) value from the output of the first adder 558 to obtain a filtered noise sample $e_{k,n}$ (error data).

Furthermore, in one embodiment of the invention, based on Equations (1.0) and (1.1) and with the noise predictive filter coefficients $f_{n,1}$, $f_{n,2}$ and $f_{n,3}$ and the edge_mean(n) values in steady state, the error gradient generator 560 computes an LMS (Least Mean Square) error gradient to adapt the coefficients of the equalization filters 525, 530 and 535 in the $n^{th}$ equalization filter bank 522 as follows:

$$\text{err}_l^{(n,j)} = \alpha \cdot (f_{n,j} \cdot x_{k-l}) \cdot e_{k,n} \qquad \text{Eqn. (2)},$$

wherein $\alpha$ is a programmable update gain to adjust the adaptation speed. The error gradient $\text{err}_l^{(n,j)}$ is feedback to adjust the $l^{th}$ coefficient of the $j^{th}$ equalization filter in the $n^{th}$ equalization filter bank 522 for the $n^{th}$ data pattern. From the above equations, it can be seen that the coefficients of the equalization filters 525, 530 and 535 in the equalization filter bank 522 are jointly adapted to reduce the variance of the filter noise sample $e_{k,n}$ output of from the second adder 565. In this manner, the sample stream output from the analog-to-digital converter 515 is cooperatively equalized by each equalization filter bank 522 (blocks 525, 530 and 535) to reduce the variance of the noise $e_{k,n}$ data, which is output from the second adder 565 and input to the detector 570.

In one embodiment of the invention, the detector 570 implements a MLSD (Maximum Likelihood Sequence Detection). With MLSD, a trellis is used to represent all possible data sequences with each path in the trellis representing a particular data sequence and each path comprising a certain number of connected branches. The detector 570 computes the branch metric associated with the $n^{th}$ data pattern as follows:

$$bm_k^n = e_{k,n} \cdot e_{k,n} \qquad \text{Eqn. (3)}$$

The branch metrics are further accumulated to get the path metrics. The maximum likelihood sequence is detected by selecting the path with the best path metric. The detector 570 provides hard and/or soft decisions of the detected data sequence to decoder circuitry which performs hard or soft decoding (e.g., RLL decoding, or LDPC decoding) of the encoded symbols into the actual binary data. The output of the decoding circuitry provides the actual binary data to the disk controller for output to a host device.

FIG. 6 is a block diagram of a filter coefficient generator circuit shown in FIG. 5, according to an embodiment of the invention. In particular, FIG. 5 illustrates an embodiment the noise predictive filter coefficient generator 545 comprising a first delay block 600, a target finite impulse response filter 605, a first adder 610, noise predictive finite impulse response filters 615, a second delay block 620, a second adder 625, an error gradient generator 630, a bias adaptation block 635, a first multiplier 640, a second multiplier 645, and a look-up table 650. As shown in FIG. 6, an equalized sample stream $y_{k+\Delta}$ (which represents a delayed version of the y sample stream $y_k$ at the output of the equalization filter 520 (FIG. 5)) is passed through the first delay block 600, wherein the first delay block 600 outputs a stream $y_k$ which represents a delayed version of the sample stream $y_{k+\Delta}$. The detection results output from the Viterbi detector 540 (FIG. 5) are input to the target finite impulse response filter 605 which generates a filtered output $\widehat{y_k}$. The filtered output $\widehat{y_k}$ is an estimated ideal target sample given by:

$$\widehat{y_k} = \Sigma_{i=0}^2 t_i \cdot \hat{a}_{k-i} \qquad \text{Eqn. (4)},$$

where $t_i$ denotes a coefficient of the target finite impulse response filter 605 (which is assumed to be a 3-tap target) and $\hat{a}_{k-i}$ denotes an estimated NRZ sample from the Viterbi detector 540.

The delayed equalized sample stream $y_k$ and the filtered output $\widehat{y_k}$ are input to the first adder 610, which outputs a noise sample stream $n_k$, wherein the noise sample is given by:

$$n_k = y_k - \widehat{y_k} \qquad \text{Eqn. (5)}.$$

The noise sample stream $n_k$ is further filtered by the noise predictive finite impulse response filters 615 using corresponding filter coefficients that are selected based on the detected data pattern $\hat{a}_k, \hat{a}_{k-1}, \ldots, \hat{a}_{k-\nu+1}$ output from the Viterbi detector 540. An output of the noise predictive finite impulse response filters 615 is input to the second adder 625, which subtracts a corresponding prediction bias value (output from the bias adaptation block 635) to generate a prediction error for each data pattern. The prediction error is input to the multiplier 640, wherein the prediction error is multiplied by programmable filter gain values that are also input to the multiplier 640. The output of the multiplier 640 is used by the bias adaptation block 635 to dynamically adapt the prediction bias values for the data patterns.

The error gradient generator 630 receives as input a delayed version of the noise sample stream $n_k$ output from the delay element 620, as well as the prediction error values for each data pattern output from the second adder 625, and generates error gradient values for each data pattern. The error gradient values are input to the multiplier 645, wherein the error gradient values are multiplied by programmable NPFIR filter gain values that are also input to the multiplier 645. Moreover, the output of the multiplier 645 is used by the noise predictive finite impulse response filters 615 to dynamically adapt the noise predictive filter coefficients for the data patterns.

In one embodiment of the invention, the adaption process implemented by the noise predictive filter coefficient generator 545 dynamically adapts (updates) one noise predictive finite impulse response filter at each decision instance based on the decision pattern $[\hat{a}_k, \hat{a}_{k-1}, \ldots, \hat{a}_{k-3}]$, where it is assumed that the corresponding data pattern for each noise predictive finite impulse response filter is a 4-bit data pattern.

Now assuming that i is the index of the data pattern $[\hat{a}_k, \hat{a}_{k-1}, \ldots, \hat{a}_{k-3}]$, the prediction error $e_{k,i}$ for the $i^{th}$ data pattern is given by:

$$e_{k,i} = \Sigma_{j=0}^2 f_{i,j}^k \cdot n_{k-j} - b_i^k \qquad \text{Eqn. (6)}$$

Then the filter coefficient for the noise predictive finite impulse response filter is updated as:

$$f_{i,j}^{k+1} = f_{i,j}^k - e_{k,i} \cdot n_{k-j} \cdot npfir\_gain \qquad \text{Eqn. (7)}$$

and the bias is updated as:

$$b_i^{k+1} = b_i^k + e_{k,i} \cdot bias\_gain \qquad \text{Eqn. (8)}$$

The edge_mean(i) for the given data pattern (i) is given by:

$$edge\_mean_i^k = b_i^k + \Sigma_{j=0}^2 \widehat{y_{k-j}} \cdot f_{i,j}^k \qquad \text{eqn. (9)}$$

During the adaption process, most recently updated filter coefficients, $f_{n,1}$, $f_{n,2}$ and $f_{n,3}$ for each data pattern index n (e.g., 3-tap filter) are stored in the look-up table 650, and the most recently updated edge_mean(n) value for each data pattern index n is stored in the look-up table 650. When the adaptation process converges, the filter coefficient values and edge_mean(n) values in the look-up table 650 remain fixed. During the adaptation phase and after the adaptation phase, the most currently adapted values (during adaptation) or fixed values (after adaptation) of the filter coefficient and edge_mean(n) values are retrieved from the look-up table 650 and output to the Viterbi detector 540 to generate the branch metrics to perform a data sequence detection process for purposes of calibration. As discussed above with reference to FIG. 5, after the NPFIR calibration stage, the NPFIR coefficients and edge_mean(n) values are also applied to block 550 and block 565 to generate the filtered noise stream (output of block 565) with reduced variance which is further processed by detector 570 to perform the final data sequence detection. The look-up table 650 shown in FIG. 6 is a data structure that can be stored in ROM or RAM memory of the system-on-chip 300 of FIG. 3, for example.

As described above, a cooperative equalization scheme is employed to significantly reduce the noise variance at the output of the noise predictive filter 550 without compromising minimum distance of the Viterbi-based detection process implemented by the detector 570 based on noise predictive finite impulse response filtering. A cooperative equalization scheme as described herein provides an efficient process to reduce the noise variance at the outputs of the n noise predictive filters without compromising the minimum distance of the detector 570 that is largely determined by the equivalent targets which is equal to the convolution of the n noise predictive filters and the equalization target of the equalization filter 520.

Figure 7:
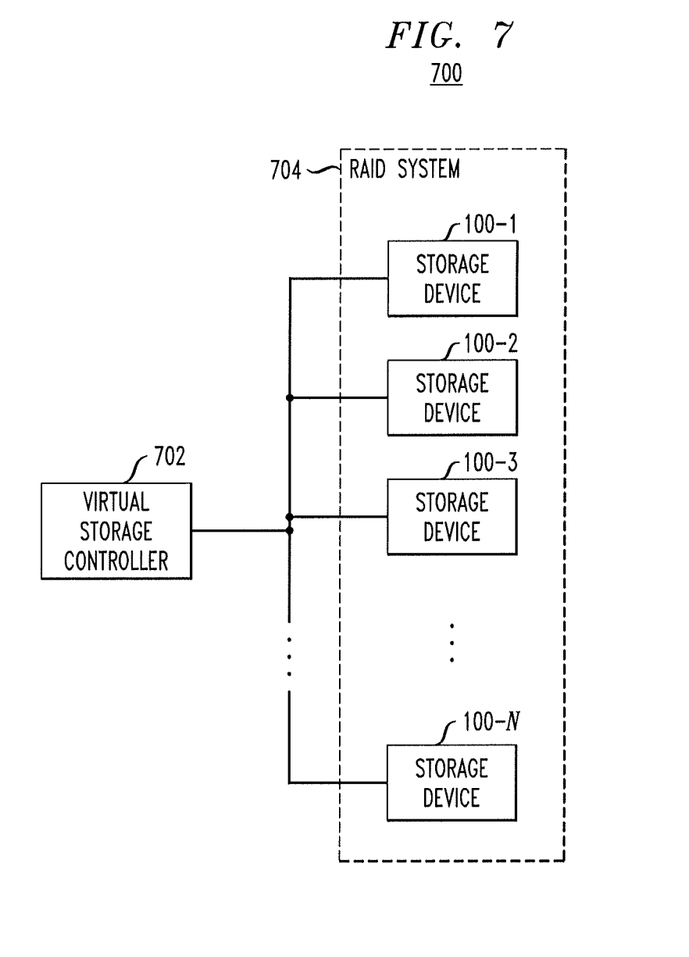
FIG. 7 shows a virtual storage system incorporating a plurality of disk-based storage devices of the type shown in FIG. 1.

Multiple disk-based storage devices 100 may be incorporated into a virtual storage system 700 as illustrated in FIG. 7. The virtual storage system 700, also referred to as a storage virtualization system, illustratively comprises a virtual storage controller 702 coupled to a RAID system 704, where RAID denotes Redundant Array of Independent Disks. The RAID system more specifically comprises N distinct storage devices denoted 100-1, 100-2, . . . , 100-N, one or more of which are assumed to be configured to include embodiments of a system-on-chip with an integrated circuit as shown in FIG. 5 for performing data sequence detection. These and other virtual storage systems comprising hard disk drives or other disk-based storage devices of the type disclosed herein are considered embodiments of the invention. A host processing device may also be an element of a virtual storage system, and may incorporate the virtual storage controller 702.

Although embodiments of the invention have been described herein with reference to the accompanying drawings, it is to be understood that embodiments of the invention are not limited to the described embodiments, and that various changes and modifications may be made by one skilled in the art resulting in other embodiments of the invention within the scope of the following claims

What is claimed is:

1. A method for detecting a data sequence, comprising:
generating a sample stream, wherein the sample stream is a time-sequenced digital signal associated with samples of an analog signal;
inputting the sample stream to n equalization filter banks, wherein each equalization filter bank comprises m equalization filters, and wherein n and m are each greater than 1;
equalizing the sample stream using the m equalization filters in each of the n equalization filter banks to generate m equalized sample streams in each of the n equalization filter banks;
inputting the m equalized sample streams from each of then equalization filter banks to a corresponding one of n noise predictive filters, wherein each noise predictive filter comprises an m-tap noise predictive filter that receives the m equalized sample streams from a corresponding one of the n equalization filter banks, and wherein each noise predictive filter is associated with one of n data patterns each corresponding to a respective one of the n equalization filter banks;
generating a filtered equalization stream by each of the n noise predictive filters;
generating n noise sample streams using the filtered equalization streams generated by the n noise predictive filters; and
detecting a data sequence using the n noise sample streams.

2. The method of claim 1, wherein $n=2^v$, where v is a number of bits of each data pattern.

3. The method of claim 1, further comprising adaptively generating m filter coefficients for the m taps of each of the n noise predictive filters.

4. The method of claim 1, wherein generating n noise sample streams using the filtered equalization streams generated by then noise predictive filters comprises:
obtaining an corresponding edge_mean value for each of then noise predictive filters,
wherein the edge_mean value for a given noise predictive filter is a mean value of a desired signal for the data pattern associated with the given noise predictive filter; and
subtracting the edge_mean value from the filtered equalization stream to generate a noise sample stream for the given noise predictive filter.

5. The method of claim 4, further comprises adaptively generating the edge_mean values for the n noise predictive filters.

6. The method of claim 1, wherein each of them equalization filters in given equalization filter bank has a different equalization target.

7. The method of claim 1, wherein them equalization filters in each equalization filter bank are digital finite impulse response filters.

8. The method of claim 1, further comprising dynamically adapting filter coefficients of the m equalization filters in each equalization filter bank using an associated noise sample stream and the sample stream.

9. The method of claim 1, wherein inputting them equalized sample streams from each of the n equalization filter banks to a corresponding one of n noise predictive filters comprises:
inputting each of them equalized sample streams to a corresponding one of m multipliers;

inputting each of m noise predictive filter coefficients into a corresponding one of the m multipliers;

multiplying the m equalized sample streams with the corresponding ones of the m noise predictive filter coefficients to generate m weighted equalization streams at the outputs of the m multipliers; and adding the m weighted equalization streams together to generate the filtered equalization sample stream for a given noise predictive filter.

10. The method of claim 1, wherein the analog signal is an analog read channel signal containing data read from a storage disk.

11. The method of claim 1, wherein each of the m taps of a given m-tap noise predictive filter is associated with a corresponding one of the m equalized sample streams output from a given equalization filter bank which corresponds to the given m-tap noise predictive filter.

12. A data detection circuit, comprising:
an analog-to-digital converter to generate a sample stream;
n equalization filter banks, wherein each equalization filter bank comprises m equalization filters to equalize the sample stream and generate m equalized sample streams in each of the n equalization filter banks, and wherein n and m are each greater than 1;
n noise predictive filters, wherein each noise predictive filter comprises an m-tap noise predictive filter that receives them equalized sample streams output from a corresponding one of the n equalization filter banks and generates a filtered equalization stream, and wherein each noise predictive filter is associated with one of n data patterns each corresponding to a respective one of the n equalization filter banks;
n adder circuits to generate n noise sample streams using the filtered equalization streams generated by the n noise predictive filters; and
a detector to detect a data sequence using the n noise sample streams.

13. The circuit of claim 12, wherein n=2$^v$, where v is a number of bits of each data pattern.

14. The circuit of claim 12, further comprising a noise predictive filter coefficient generator circuit to adaptively generate m filter coefficients for the m taps of each of the n noise predictive filters.

15. The circuit of claim 14, further comprising:
an equalization filter to equalize the sample stream; and
a Viterbi detector to detect data patterns in the equalized sample stream, wherein the noise predictive filter coefficient generator circuit adaptively generates a corresponding set of m filter coefficients for each of the n data patterns, and updates values for the corresponding set of m filter coefficients for corresponding ones of the n data patterns detected by the Viterbi detector in the equalized sample stream.

16. The circuit of claim 14, wherein the noise predictive filter coefficient generator circuit adaptively generates a corresponding edge_mean value for each of the n data patterns, wherein a given edge_mean value is a mean value of a desired signal for a given data pattern associated with a given noise predictive filter, wherein each edge_mean value is applied to a corresponding one of the n adder circuits and subtracted from the filtered equalization stream to generate a noise sample stream for the given noise predictive filter.

17. The circuit of claim 12, wherein them equalization filters in each equalization filter bank are digital finite impulse response filters.

18. The circuit of claim 12, wherein them equalization filters in a given equalization filter bank have different equalization targets.

19. The circuit of claim 12, further comprising an error gradient generator circuit to dynamically generate error gradient data that is used to adapt filter coefficients of the m equalization filters in each of the n equalization filter banks using a corresponding one of the n noise sample streams and the sample stream output from the analog to digital converter.

20. The circuit of claim 12, wherein each noise predictive filter comprises:
m multipliers to multiply them equalized sample streams with a corresponding one of the m noise predictive filter coefficients and generate m weighted equalization streams; and
an adder to add the m weighted equalization streams together to generate the filtered equalization sample stream for the noise predictive filter.

21. A read channel integrated circuit comprising the circuit of claim 12, wherein the analog signal is an analog read channel signal containing data read from a storage disk.

22. A storage device comprising:
a storage medium;
a read head configured to read data from the storage medium; and
control circuitry coupled to the read head and configured to process data received from the read head;
the control circuitry comprising the circuit of claim 12.

23. A virtual storage system comprising the storage device of claim 22.

24. The circuit of claim 12, wherein each of them taps of a given m-tap noise predictive filter is associated with a corresponding one of the m equalized sample streams output from a given equalization filter bank which corresponds to the given m-tap noise predictive filter.

* * * * *